United States Patent [19]

Haraikawa

[11] 4,088,204

[45] May 9, 1978

[54] MECHANICAL DISC BRAKE INCLUDING FLOATING ACTUATOR

[75] Inventor: Tetsuo Haraikawa, Funabashi, Japan

[73] Assignee: Tokico Ltd., Kawasaki, Japan

[21] Appl. No.: 768,904

[22] Filed: Feb. 15, 1977

[30] Foreign Application Priority Data

Feb. 20, 1976 Japan .................................. 51-17796
Feb. 20, 1976 Japan .................................. 51-17798

[51] Int. Cl.$^2$ .............................................. F16D 65/38

[52] U.S. Cl. ................................. 188/71.7; 188/72.7; 188/196 M; 192/70.23; 192/70.25; 192/111 R

[58] Field of Search .................... 188/71.9, 71.7, 72.7, 188/196 M, 196 BA; 192/70.23, 70.25, 111 R

[56] References Cited

U.S. PATENT DOCUMENTS

| | | | |
|---|---|---|---|
| 2,170,893 | 8/1939 | Gallup | 188/71.7 |
| 3,024,873 | 3/1962 | Wilkinson | 188/71.7 |
| 3,194,349 | 7/1965 | Kershner et al. | 188/72.7 X |
| 3,321,049 | 5/1967 | Swift | 188/71.9 |
| 3,322,235 | 5/1967 | Forbush | 188/71.9 |
| 3,789,959 | 2/1974 | Kawaguchi | 188/71.9 |
| 3,920,102 | 11/1975 | Ito | 188/71.9 |

FOREIGN PATENT DOCUMENTS

| | | | |
|---|---|---|---|
| 1,144,306 | 3/1969 | United Kingdom | 188/72.7 |
| 1,059,177 | 2/1967 | United Kingdom | 188/72.7 |

*Primary Examiner*—George E. A. Halvosa
*Attorney, Agent, or Firm*—Schmidt, Johnson, Hovey & Williams

[57] ABSTRACT

An improved mechanical disc brake, of the type in which a rotational operating force applied to a nut member adjustably carrying a push rod is converted into linear axial movement of the nut member and push rod to cause the push rod to move a brake pad engaged thereby into braking engagement with the disc, is provided in which the nut member is floatingly mounted on the housing of the brake for minimizing the wear and other adverse effects of natural vibration of the housing, and in which there is a device for urging the nut member into a self-centering position for maintaining the push rod in optimum relationship with the associated brake pad. The improved brake construction also facilitates provision for proper dust covers, lessens the precision required in the manufacture of certain parts, and permits proper adjustment of the brake to be accomplished even after replacement of the brake pads. The improved construction employs an opposed groove and ball mounting of a flange portion of the nut member upon the associated leg portion of the housing and a spring device for biasing the position of the nut member relative to such leg portion of the housing, with there being no direct engagement between the nut member and such leg portion of the housing.

10 Claims, 2 Drawing Figures

MECHANICAL DISC BRAKE INCLUDING FLOATING ACTUATOR

BACKGROUND OF THE INVENTION

This invention relates to a mechanical disc brake of the type in which a brake lever rotates in response to a rotational input which is imparted thereto by a cable and the like and the rotational input imparted to the lever is then converted into a linear output which in turn effects a braking action and more particularly, to a mechanical disc brake which has a manual clearance adjusting means adapted to provide a predetermined or desired braking force by adjusting the clearances between the brake disc and friction pads so as to maintain the clearances within a predetermined value range at all times.

There have been proposed and practically employed a variety of brake discs having a mechanism adapted to convert a rotational input into a linear output and in any of the conventional disc brakes of the type, an axially movable push rod is adapted to directly receive an input to apply friction pads against a disc and a nut member is disposed on the push rod to rotate about the push rod and also to move linearly together with the push rod in the axial direction of the rod under the action of steel balls which displace along spherical faces. The nut member is fitted in and supported by a housing or a stationary member secured to the housing. That is, the entire nut member is fitted in and supported by the housing or the stationary member secured to the housing, in threaded engagement with the push rod and held in position by steel ball holding faces.

Such arrangement of the nut member in the conventional disc brake has the disadvantages that smooth rotation of the nut member is precluded due to varying tolerances in the manufacture of component parts and more particularly, due to the deviation of the center of rotation of the nut member support face from the center of rotation of the steel balls and in other words, due to the variation of the center of rotation determined by a plurality of steel balls (in most cases, three steel balls) from the center of rotation determined by the nut member supporting face and that the nut supporting portion of the housing or the stationary support member is easily subjected to wear. Furthermore, since a clearance is present in the nut supporting portion for rotatably receiving the nut member, the nut supporting portion wears away prematurely due to vibration of the brake device.

In the manual brake clearance adjusting means referred to hereinabove, the push rod adapted to transmit the linear movement produced by the mechanism which is designed to convert the rotational movement into the linear movement to the friction pad is provided with threads and the push rod is turned at one end by a screw driver or the like tool whereby the push rod is screwed out of the nut member which is in threaded engagement with the push rod so as to adjust the brake clearance. The other end of the push rod is formed with a polygonal cross-section configuration such as square or hexagonal configuration and a rotation regulation member engages the polygonal cross section end to prevent inadvertent rotation of the push rod which may occur due to vibration or other undesirable movement of the push rod so as to effect correct clearance adjustment.

In one example of the above-mentioned type of brake discs, the rotation regulation member is secured to one friction pad in consideration of the limited space within the disc brake as shown in commonly owned co-pending U.S. patent application Ser. No. 657,623, filed Feb. 12, 1976, now U.S. Pat. No. 4,022,299. In such arrangement, great difficulty is encountered in mounting a dust cover which is adapted to protect the rotation regulation member from moisture, mud and dust and as a result, the dust cover can not be employed in that earlier type of disc brake. Therefore, the disc brake has the disadvantage that mud, dust and other foreign matter tends to adhere to the rotation regulation member to the extent that the rotation regulation member comes to a standstill and rusts prematurely to thereby render the clearance adjustment operation difficult.

Furthermore, the component parts of such earlier disc brake are required to be fabricated and processed with high precision so that the polygonal cross-section end of the push rod can properly engage the rotation regulation member.

And in the brake device of the type referred to hereinabove, when the friction pad or pads are desired to be replaced by a new friction pad or pads, since it is very difficult to confirm whether the rotation regulation member is in proper engagement with a suitable position on the push rod, such confirmation is often neglected and as a result, the rotation regulation member is easily damaged.

SUMMARY OF THE INVENTION

Therefore, one object of the present invention is to provide a disc brake which can effectively eliminate the disadvantages inherent in the conventional disc brakes referred to hereinabove. According to the present invention, in order to eliminate the deviation of the center of rotation of the nut member supporting face with respect to the center of rotation of the steel balls, the nut member is held only by the steel balls whereby premature wear of the nut member is effectively precluded and the number of processing steps required in the fabrication of the nut member can be reduced.

Another object of the present invention is to provide a disc brake having a manual brake clearance adjusting means which can effectively eliminate the disadvantages inherent in the conventional brake clearance adjusting means, operates properly for a long time period and is simple to manufacture. In order to attain this object, according to the present invention, the rotation regulation member is substantially integrally secured to the nut member which is in threaded engagement with the push rod and also serves as the dust cover holding means so that the dust cover can be easily mounted.

The above and other objects and attendant advantages of the present invention will be more readily apparent to those skilled in the art from a reading of the following detailed description in conjunction with the accompanying drawing which shows one preferred embodiment of the invention for illustration purpose only, but does not limit the scope of the same in any way.

PREFERRED EMBODIMENT OF THE INVENTION

Figure 1:
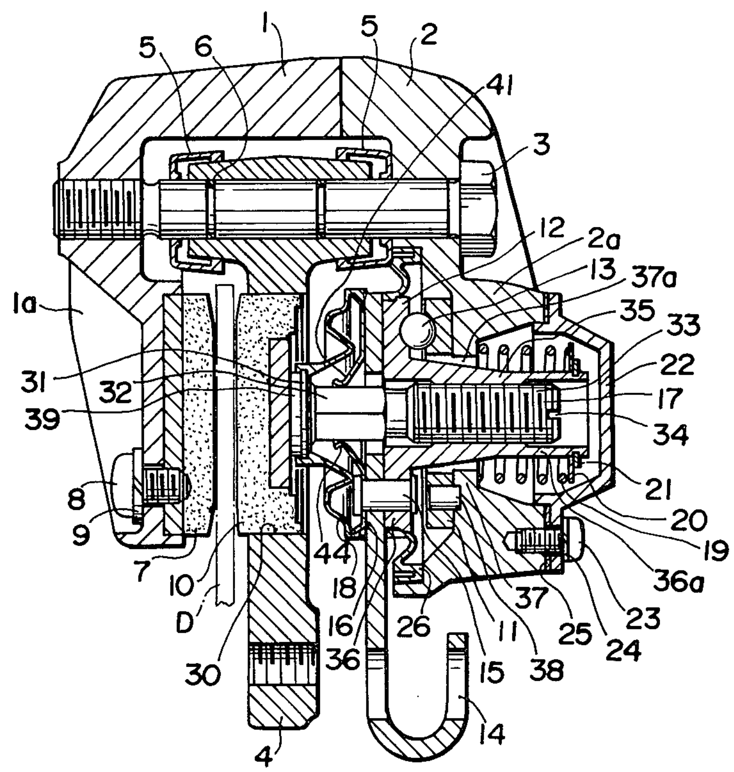
FIG. 1 is a horizontally cross-sectional view of one preferred embodiment of mechanical disc brake constructed in accordance with the present invention.

The present invention will now be described referring to the accompanying drawing and more particularly, to FIG. 1 thereof in which a preferred embodiment of mechanical disc brake of the invention is illustrated. As in the case of the conventional mechanical disc brakes of the type referred to hereinabove, the disc brake generally comprises a housing which includes a first half portion 1 and a second half portion 2 which are integrally connected together by means of a bolt 3. O-rings 6 are disposed about the bolt 3 in spaced positions along a portion of the shank of the bolt positioned within the housing first half portion 1 so that the bolt 3 is guided within a guide hole formed in the bracket 4 of a stationary support (not shown) for slidable movement relative to the stationary support. The opposite ends of the guide hole in the support bracket 4 are protected by boots 5, 5 against entry of foreign matter to the interface between the bolt and guide hole. A pair of friction pads 7, 10 are disposed on the opposite sides of a brake disc D. One of the friction pads 7 is fixedly secured to the leg *1a* of the housing first half portion 1 by means of a set screw 8 and a spring washer 9 whereas the other friction pad 10 is received in a center through opening 30 in the support bracket 4. The back or outer side (the right-hand side as seen in FIG. 1) is engaged by the enlarged diameter innermost end 39 of a push rod 17 whereby any oblique abutment of the friction pad 10 against the disc D which may result in unequal wear of the friction pad 10 can be effectively prevented. The push rod is received within the through opening *37a* in the leg *2a* of the housing second half portion 2 for both axial displacement and rotation.

The push rod 17 further has a stepped portion 31 positioned rearwardly of the innermost end 39 which portion has a diameter greater than that of the innermost end, a polygonal cross-section rotation restraining portion 32 (the hexagonal cross-section in the illustrated embodiment, but the polygonal configuration may be square in cross-section) positioned rearwardly of the stepped portion 31 and having a diameter smaller than that of the innermost end 39 and an adjusting threaded portion 33 positioned rearwardly of the polygonal cross-section portion 32 and having substantially the same diameter as that of the polygonal cross-section portion 32. A slit 34 is formed in the outer or right-hand end (as seen in FIG. 1) of the push rod 17 for receiving a screw driver or the like tool for the purpose as will be described hereinbelow. A nut member 12 is disposed about the push rod 17 within the through opening 37a in the housing leg *2a* and has the inner threaded surface 35 in threaded engagement with the rotation restraining threaded portion 33 of the push rod 17.

The nut member 12 has an enlarged diameter flange 36 at the leading or innermost end and a leg portion *36a* extending rearwardly of the flange 36 into the through opening *37a* in the housing leg *2a*. A brake lever 14 is provided in front of the inner or left-hand side of the flange 36 and is adapted to transmit a rotational input from a cable connected to the lever to the nut member 12 and a resilient rotation regulation member 16 abuts against the inner or left-hand side of the brake lever 14 and against the polygonal cross-section portion 32 of the push rod 17. The flange 36 of the nut member 12, the brake lever 14 and the rotation regulation member 16 are integrally connected together in a simple way by means of three rivets 15 arranged in equiangularly spaced relationship.

Figure 2:
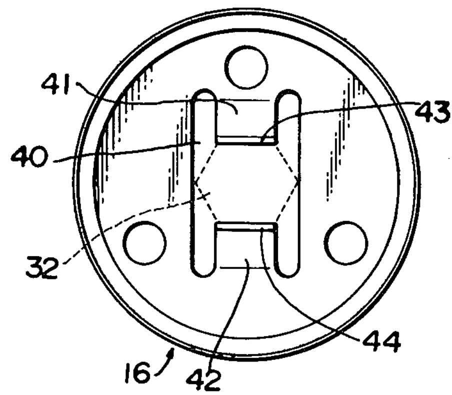
FIG. 2 is a plan view on an enlarged scale of the rotation regulation member of said disc brake as shown in FIG. 1.

As is more clearly shown in FIG. 2 which shows the rotation regulation member 16 on an enlarged scale, the rotation regulation member 16 has a cut 40 of a substantially H-shape as formed by punching, for example, in the center of the member and the opposite legs of the H-shape define diametrically opposite upper and lower engaging pieces 41, 42 therebetween. The engaging pieces 41, 42 are bent forwardly or leftwards as seen in FIG. 1 with the free or leading ends of the engaging pieces further bent in the direction opposite to the rest of the engaging pieces (as seen in FIG. 1). The bent free ends 43, 44 of the engaging pieces 41, 42, respectively, are adapted to engage the selected faces on the polygonal cross-section portion 32 of the push rod 17 to embrace the rod polygonal cross-section portion to thereby regulate the rotation of the push rod 17 (as shown with the dotted line in FIG. 2). The rotation regulation member 16 also has three equally and angularly spaced holes about the H-shaped center cut 40 at an equal distance from the center of the regulation member 16. The above-mentioned rivets 15 extend through the three angularly spaced holes in the rotation regulation member 16. The entire outer periphery of the rotation regulation member 16 inclines forwardly or leftwards as seen in FIG. 1 so that the outer periphery of the rotation regulation member 16 is spaced from the adjacent side of the brake lever 14 to provide a clearance between the two members. The outer periphery of a dust boot 18 is inserted within the clearance to be held in position by the outer periphery of the rotation regulation member 16 whereas the inner periphery of the dust boot 18 abuts against the largest diameter stepped portion 31 of the push rod 17. In this way, the dust boot 18 perfectly shields the rotation regulation member 16 from the atmosphere to thereby prevent mud, dust and other foreign matter from access to the rotation regulation member 16.

Disposed in opposition to the outer or right-hand side of the flange 36 is a ramp member 11 which is secured to a shoulder 37 defined by the through opening *37a* in the leg *2a* of the housing second half portion 2 by means of suitable fastners 38 (only one faster 38 is shown in FIG. 1). The outer or right-hand side of the flange 36 and the inner or left-hand side of the ramp member 11 are provided with spherical grooves (not shown) for receiving steel balls 13. Since the shapes, arrangement and operation of the spherical grooves and steel balls are well known in the art, detailed description of them will be omitted herein.

The leg portion *36a* of the nut member 12 freely extends through the through opening *37a* in the leg *2a* of the housing second half portion which defines the shoulder 37 and a stop ring 21 is disposed about the nut member 12 in a position adjacent to the rear or outer end of the nut member and an annular plate 20 is also disposed about the nut member with the outer or right-hand side of the plate supported by the inner or right-hand side of the stop ring. A spring 19 extends between the annular plate 20 and the shoulder 37 on the leg *2a* of the housing second half portion 2 for biasing the nut member 12 against the ramp member 11 through the steel balls 13.

A dust cover 26 is disposed between the outer periphery of the flange 36 of the nut member 12 and a selected area of the housing second half portion 2 to prevent mud, dust and other foreign matter from access to the nut member 12, steel balls 13 and ramp member 11.

In the disc brake of the invention, when the brake lever 14 is rotated by manipulating the cable and the like, the nut member 12, rotation regulation member 16 and push rod 17 are also rotated. As in the case of the conventional disc brakes, in such a case, the flange 36 and ramp member 11 having opposed spherical grooves and the steel balls 13 received in the grooves act to produce a thrust which urges the nut member 12 towards the disc D and the thus produced thrust applies the pad 10 against the right-hand side of the disc D (as seen in FIG. 1) through the push rod 17 and at the same time, a thrust which urges the ramp member 11 rearwardly (right-hand side as seen in FIG. 1) is produced whereby the pad 7 is applied against the left-hand side of the disc D through the housing second half portion 2, the bolt 3 and the housing first half portion 1 so as to effect a desired braking action.

As the pads 7, 10 wear away, the rotation stroke of the brake lever 14 increases accordingly. In such a case, a cover 22 which is secured to the outer surface of the housing second half portion 2 by means of a set screw 23 as well as a packing 25 and a washer 24 is detached from the housing half portion 2 by removing the screw, packing and washer. Thereafter, a driver or the like tool is inserted into the slit 34 in the push rod 17 to turn and advance the push rod so as to adjust the clearance between the pad 10 and disc D for compensating the wear of the pads 7, 10.

The spring 19 is preferably a spring having a relatively high rating as high as 10 – 20 kg and the spring urges the nut member 12 against the ramp member 12 through the plurality of steel balls 13 (preferably, three steel balls) to maintain the nut member 12 in a floating relationship with respect to the housing second half portion 2 and as a result, different from the corresponding parts in the conventional disc brakes, the nut member 12 and accordingly, the lever 14 and push rod 17 are not directly subjected to the influence of the housing such as the vibration of the housing. The spring 19 serves to absorb the rattling of the lever 14 and also acts as the return spring for the lever.

In the disc brake of the present invention, when it is desired to adjust the clearance between the pad 10 and disc D, the engaging pieces 41, 42 of the rotation regulation member 16 are caused to yieldingly deform as the result of the forced rotation of the push rod 17 to allow the rod 17 to rotate and at such a time, the engaging pieces 41, 42 click when they engage the succeeding faces of the polygonal cross-section portion 32 of the push rod 17 to thereby give notice to the operator of the distance the push rod 17 has been fed and also preclude any inadvertent rotation of the push rod due to vibration and the like of the rod. Furthermore, the outer periphery of the push rod serves as the holding means of the dust boot 18.

With the above-mentioned construction and arrangement of the components of the disc brake of the invention, the nut member can rotate smoothly and reduce wear of the housing or stationary support. Thus, the present invention provides a practical disc brake which can effectively eliminate the disadvantages inherent in the conventional disc brakes of the same type. And as mentioned hereinabove, since the rotation regulation member 16 is substantially integrally secured to the nut member 12, the replacement of the pads can be easily performed and the mounting of the dust boot 18 can be easily and satisfactorily performed whereby all the disadvantages inherent in the conventional disc brakes can be perfectly eliminated.

While only one embodiment of the invention has been shown and described in detail it will be understood that the same is for illustration purpose only and not to be taken as a definition of the invention, reference being had for this purpose to the appended claims.

What is claimed is:

1. In a disc brake:

a rotatable disc to be braked;

fixed support means;

friction pad means having a friction side for engaging a portion of one side of said disc when the brake is operated and an opposite side to which a substantially linear force may be applied for operating the brake, said pad means being shiftably carried by said support means for substantially linear movement thereof between a normal disposition in which said friction side is in adjacent facing relationship to said portion of said disc and a braking disposition in which said friction side is in forceful braking engagement with said portion of said disc;

housing means carried by said support means and including a leg portion spaced from said opposite side of said pad means in a direction away from said disc, said leg portion including wall structure defining a clearance opening therethrough disposed in alignment with said pad means and said portion of said disc;

nut means having an axis and including an axial body portion extending through said opening and an out-turned flange portion adjacent one extremity of said body portion disposed between said pad means and marginal parts of said leg portion around the extremity of said opening proximate said pad means, said body portion being of substantially lesser external transverse size than corresponding internal dimensions of said opening, whereby said body portion is loosely receivable within said opening in spaced relationship to said wall structures defining said opening;

means for floatingly mounting said nut means on said leg portion for rotation of said nut means about said axis thereof and for substantially linear movement of said nut means along said axis toward and away from said pad means, and for maintaining said axis substantially centered with respect to said opening for keeping said body portion in spaced relationship to said wall structures, said mounting and maintaining means including spring means operably intercoupled with said leg portion and said nut means for yieldably biasing the latter along its axis in a direction away from said pad means to urge said flange portion toward said marginal parts of said leg portion, and guide means having cooperating guiding structures and associated bearing elements operably coupling said flange portion and said marginal parts for permitting and substantially limiting relative motion therebetween to said rotational and linear movements;

motion conversion means, including ramp means operably associated with said guide means, for shifting said nut means substantially linearly along said axis toward said pad means when said nut means is rotated in one direction;

push rod means mounted on said nut means and extending therefrom along said axis toward and into proximity with said opposite side of said pad means for engagement of the latter by the proximate extremity of said rod means to apply a substantially linear force to said pad means for shifting the latter into its said braking disposition when said nut means is rotated in said one direction; and operating means operably coupled with said nut means for applying an operating force to rotate the same in said one direction about said axis.

2. The brake as set forth in claim 1, wherein said body portion of said nut means is axially tubular and is threaded along a part of the internal surface thereof, said push rod means is externally threaded along a stretch thereof remote from said extremity thereof proximate said pad means, and said rod means is adjustably mounted on said body portion of said nut means by threaded fitting of said stretch of said rod means in said threaded part of said body portion.

3. The brake as set forth in claim 2, wherein said push rod means includes a stretch thereof between said extremity thereof proximate said pad means and said nut means which is of polygonal transverse cross-section, and there is provided a rotation regulation member secured to said nut means and including at least one resilient piece in yieldable engagement with said polygonal stretch of said rod means for preventing undesired movement of said push rod means relative to said nut means.

4. The brake as set forth in claim 3, wherein the extremity of said push rod means remote from said pad means is provided with means engageable by a tool from outside said housing means for turning said push rod means relative to said nut means to adjust the normal position of the extremity of the push rod means proximate said pad means relative to said opposite side of the latter to compensate for the natural wear of said pad means.

5. The brake as set forth in claim 4, wherein is provided a dust cover mounted on said leg portion in covering relationship to the extremities of said body portion and said opening remote from said pad means, said cover being removable to permit access with said tool to said engageable means on said push rod means for adjusting the latter relative to said nut means.

6. The brake as set forth in claim 1, wherein said body portion of said nut means is provided with stop means adjacent the extremity thereof remote from said flange portion, said leg portion is provided with a shoulder around said opening facing away from said pad means, and said spring means comprises a compression coil spring disposed about a part of said body portion and oppositely engaging said stop means and said shoulder.

7. The brake as set forth in claim 1, wherein said guiding structures comprise opposed grooves in said flange portion and said marginal parts of said leg portion respectively, and said bearing elements comprise balls between said flange portion and said marginal parts and commonly received in said grooves.

8. The brake as set forth in claim 1, wherein said operating means includes a lever secured to and extending outwardly from said nut means.

9. The brake as set forth in claim 1, wherein said housing means is shiftably mounted on said support means for floating movement in either direction along a path substantially parallel to the axis of rotation of said disc, said housing means includes a second leg portion spaced from a portion of the opposite side of said disc aligned with said portion of said one side of said disc, and there is provided a second friction pad means mounted on said second leg portion, said second pad means being shiftable toward and into forceful braking engagement with said portion of said opposite side of said disc when said housing is shifted in the same direction in reaction to the forceful engagement of said first-mentioned pad means with said portion of said one side of said disc.

10. The brake as set forth in claim 9, wherein said push rod means is threadably mounted on said nut means and manually adjustable relative to the latter, there is provided yieldable means for preventing motion of said push rod means relative to said nut means except during manual adjustment thereof, said spring means comprises a compression coil spring disposed about a part of said body portion of said nut means and oppositely engaging stop means on said body portion and shoulder means on said first-mentioned leg portion, said guiding structures comprise opposed grooves in said flange portion and said marginal parts of said first-mentioned leg portion respectively, and said bearing elements comprise balls between said flange portion of said nut means and said marginal parts of said first-mentioned leg means respectively and commonly received in said grooves.

* * * * *